United States Patent [19]

Aihara

[11] Patent Number: 5,191,372
[45] Date of Patent: Mar. 2, 1993

[54] CAMERA

[75] Inventor: Yoshihiko Aihara, Kanagawa, Japan

[73] Assignee: Canon Kabushiki Kaisha, Tokyo, Japan

[21] Appl. No.: 809,249

[22] Filed: Dec. 18, 1991

Related U.S. Application Data

[63] Continuation of Ser. No. 473,825, Feb. 2, 1990, abandoned.

[30] Foreign Application Priority Data

Feb. 6, 1989 [JP] Japan .................................. 1-027207
Feb. 6, 1989 [JP] Japan .................................. 1-027208

[51] Int. Cl.⁵ .............................................. G03B 13/36
[52] U.S. Cl. .................................. 354/400; 354/173.1
[58] Field of Search ............... 354/400, 402, 412, 170, 354/171, 173.1, 173.11, 441, 442, 443

[56] References Cited

U.S. PATENT DOCUMENTS

| | | | |
|---|---|---|---|
| 4,437,744 | 3/1984 | Terui et al. | 354/412 |
| 4,455,068 | 6/1984 | Izuhara | 354/412 |
| 4,508,443 | 4/1985 | Matsuzaki et al. | 354/402 |
| 4,525,054 | 6/1985 | Someya et al. | 354/443 |
| 4,609,274 | 9/1986 | Iwashita et al. | 354/400 |
| 4,616,916 | 10/1986 | Someya et al. | 354/442 |
| 4,723,139 | 2/1988 | Ogasawara | 354/402 |
| 4,772,908 | 9/1988 | Ishimura et al. | 354/400 |
| 4,774,401 | 9/1988 | Yamada et al. | 250/201 |
| 4,783,676 | 11/1988 | Aihara et al. | 354/400 |
| 4,792,820 | 12/1988 | Norita et al. | 354/402 |
| 4,801,962 | 1/1989 | Akashi | 354/402 |
| 4,829,331 | 5/1989 | Aihara | 354/400 |
| 4,881,097 | 11/1989 | Ishiguro | 354/402 |
| 4,935,766 | 6/1990 | Kikukawa et al. | 354/412 |
| 4,977,217 | 1/1991 | Aihara | 354/400 |
| 4,999,655 | 3/1991 | Fukahori et al. | 354/173.1 |

Primary Examiner—Russell E. Adams
Attorney, Agent, or Firm—Fitzpatrick, Cella, Harper & Scinto

[57] ABSTRACT

A camera includes an automatic focusing device for focusing in a mode selected from different automatic focusing modes; an advancing device for advancing a film in a mode selected from different advance modes; an exposure device arranged to execute a program selected from different exposure programs; a storing device for storing information on the automatic focusing modes, the advance modes and the exposure programs in different combinations, each combination consisting of one of the automatic focusing modes, one of the feeding modes and one of the exposure programs; a setting device for setting one of selectable photographing modes; and a control device which is arranged such that, when a photographing mode is set by the setting device a photographing operation is allowed to be performed in applicable modes including in combination an automatic focusing mode, a feeding mode and an exposure program stored by the storing device.

6 Claims, 5 Drawing Sheets

| | AF MODE | FILM ADVANCE MODE | PROGRAM CHART | PROGRAM CHART WHEN FLASH DEVICE IS USED |
|---|---|---|---|---|
| 1 | FAMILY MODE | ONE SHOT | SINGLE-FRAME SHOOTING | CHART (1) | CHART (4) |
| 2 | SNAP MODE | SERVO | CONTINUOUS SHOOTING | CHART (1) | CHART (4) |
| 3 | SCENERY MODE | ONE SHOT | SINGLE-FRAME SHOOTING | CHART (2) | CHART (4) |
| 4 | SPORT MODE | SERVO | CONTINUOUS SHOOTING | CHART (3) | CHART (4) |
| 5 | PORTRAIT MODE | ONE SHOT | CONTINUOUS SHOOTING | CHART (3) | CHART (4) |
| 6 | CLOSE-UP MODE | ONE SHOT | SINGLE-FRAME SHOOTING | CHART (2) | CHART (5) |
| 7 | PARTY MODE | ONE SHOT | SINGLE-FRAME SHOOTING | CHART (1) | CHART (6) |

FIG. 4

| | AF MODE | FILM ADVANCE MODE | PROGRAM CHART | PROGRAM CHART WHEN FLASH DEVICE IS USED |
|---|---|---|---|---|
| 1 FAMILY MODE | ONE SHOT | SINGLE-FRAME SHOOTING | CHART (1) | CHART (4) |
| 2 SNAP MODE | SERVO | CONTINUOUS SHOOTING | CHART (1) | CHART (4) |
| 3 SCENERY MODE | ONE SHOT | SINGLE-FRAME SHOOTING | CHART (2) | CHART (4) |
| 4 SPORT MODE | SERVO | CONTINUOUS SHOOTING | CHART (3) | CHART (4) |
| 5 PORTRAIT MODE | ONE SHOT | CONTINUOUS SHOOTING | CHART (3) | CHART (4) |
| 6 CLOSE-UP MODE | ONE SHOT | SINGLE-FRAME SHOOTING | CHART (2) | CHART (5) |
| 7 PARTY MODE | ONE SHOT | SINGLE-FRAME SHOOTING | CHART (1) | CHART (6) |

CAMERA

This application is a continuation of application Ser. No. 07/473,825 filed Feb. 2, 1990, now abandoned.

BACKGROUND OF THE INVENTION

1. Field of the Invention

This invention relates to a camera of the kind arranged to permit selection of exposure program modes.

2. Description of the Related Art

There have been proposed various cameras of the kind arranged to permit selection of a program which unconditionally determines an aperture value and a shutter speed (or time) according to a measured light value obtained by light measuring means. Meanwhile, cameras of the kind permitting the photographer to arbitrarily set an automatic focusing (hereinafter referred to as AF) mode, a film advance mode (or a feeding mode), a program chart, etc. also have been proposed. These cameras have been used in the following manner: In taking pictures of sport scenes, for example, a servo mode is selected as the AF mode and a continuous shooting mode as the film advance mode while a program chart for having higher shutter speeds is selected from among program charts.

However, the arrangement of these conventional cameras has necessitated a toilsome operation on the camera as these modes must be set every time one picture taking scene changes to another. For example, the AF mode must be changed from the servo mode over to a oneshot mode, the film advance mode from the continuous shooting mode over to a single-frame shooting mode and the program chart also from a high shutter speed program to a low shutter speed program. These changes require many operation procedures.

Further, in taking a picture under some photographing conditions, a beginner photographer is uncertain of correct selection of the AF mode, the film advance mode or the program chart. Then, a photographing operation might be inappositely carried out to result in a blurred or out-of-focus picture.

In connection with this, a camera has been proposed in U.S. Pat. No. 4,801,962. This camera is arranged such that, when the film advance (feeding) mode is set in the continuous shooting mode, the AF mode is automatically set in the servo mode.

SUMMARY OF THE INVENTION

It is one aspect of this invention to provide a camera which is arranged to have improved operability and to enable any person who is unfamiliar with the operation of cameras to take a picture appropriate to any photographing conditions by automatically selecting a series of modes such as an AF mode, a film advance mode (or a feeding mode), an exposure program, etc. in a manner most apposite to the photographing conditions.

The above and further objects and features of the invention will become apparent from the following detailed description of embodiments thereof taken in connection with the accompanying drawings.

BRIEF DESCRIPTION OF THE DRAWINGS

FIG. 4 shows photographing condition modes in relation to optimum combinations of a plurality of setting modes selectable by the embodiment of this invention.

DETAILED DESCRIPTION OF THE PREFERRED EMBODIMENT

Figure 1:
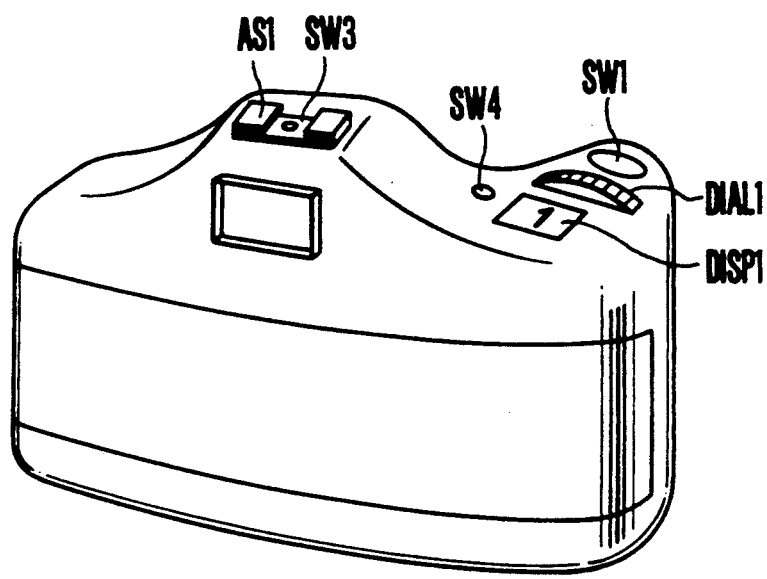
FIG. 1 is an oblique view showing an embodiment of this invention.

The details of this invention are described below through an embodiment thereof shown in the drawings:

FIG. 1 shows the appearance of a camera which is arranged according to this invention as the embodiment thereof. This illustration includes a shutter release button SW1; and a change-over switch SW3 which is provided for deciding the use or nonuse of a flash device and is disposed in such a position that enables the switch to be automatically turned on when a flash device is mounted on an accessory shoe AS1 of the camera. A dial DIAL1 is provided for input of information on a photographing condition mode to the camera. A setting button SW4 is provided also for the input of the information on the photographing condition mode and is arranged to permit the input when it is pushed while the dial DIAL1 is turned round. A display device DISP1 is arranged to display the photographing condition mode and also to display the counted value of a frame counter. The display device is composed of a liquid crystal and normally displays the counted value of the frame counter. However, when the above-stated setting button SW4 is pushed, this display is changed over to the display of a photographing condition mode selected from among the following seven different photographing condition modes:

1) A mode suited for home (or family) photographing (hereinafter referred to as a family mode).

2) A mode suited for snap photographing (hereinafter referred to as a snap mode).

3) A mode suited for landscape (or scenery) photographing (hereinafter referred to as a scenery mode).

4) A mode suited for sport photographing (hereinafter referred to as a sport mode).

5) A mode suited for portrait photography (hereinafter referred to as a portrait mode).

6) A mode suited for close-up photography (hereinafter referred to as a close-up mode).

7) A mode suited for photographing a party or gathering (hereinafter referred to as a party mode).

Figure 2:
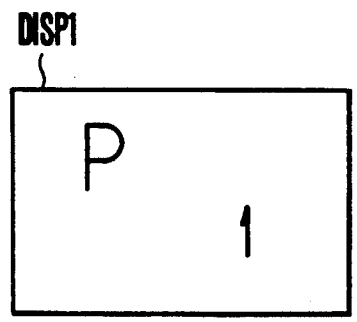
FIGS. 2 and 3 show examples of a display to be made by a display device shown in FIG. 1.

One of these modes can be selected by turning round the dial DIAL1 while pushing the setting button SW4. Then, the display device DISP1 displays a letter "P" which stands for a program and a number which stands for the photographing condition mode selected as shown in FIG. 2.

The camera begins to perform a release operation when the shutter release button SW1 is pushed. The display device DISP1 shows "1" which stands for the family mode; "2" for the snap mode; "3" for the scenery mode; "4" for the sport mode; "5" for the portrait mode; "6" for the close-up mode; or "7" for the party mode. The photographer is, therefore, required only to select one number which among others stands for the photographing condition mode desired and to push the shutter release button. After that, the camera automatically selects either a one shot mode or a servo mode for the AF mode, a continuous shooting mode or a single-frame shooting mode for the film advance mode and one of different program charts in a combination best suited to photographing conditions. As a result, a picture can be appropriately taken without fail under any photographing conditions.

Figure 3:
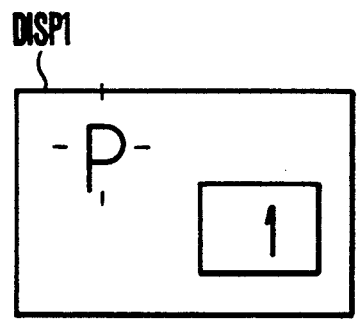

While the setting button SW4 is not pushed for setting any photographing condition mode, and also during a shutter release process, the display shows the counted value of a frame counter as shown in FIG. 3. In this instance, to distinguish the frame counted value from the photographing condition mode display, the display numeral of a counted value is encompassed with a rectangular frame as shown in FIG. 3. Further, in a case where a photographing condition mode other than the family mode is selected, the letter "P" which stands for a program is displayed in a flickering state for the purpose of calling the attention of the photographer, because: Photographing in the family mode is assumed to be most often selected and to seldom result in a failure although it has no special feature. Whereas, photographing in other modes tends to result in a failure and thus requires more attention.

Next, in the event of flash photography, the camera operation is changed to a flash mode when the switch SW3 is turned on with a flash device mounted on the accessory shoe AS1. In carrying out the flash photography, a program chart (hereinafter referred to as a flash chart) which is best suited to the applicable photographing condition mode among different flash charts.

FIG. 4 shows all the combinations of the above-stated modes that are deemed to be best suited for different photographing condition modes respectively.

As shown in FIG. 4, in the case of this embodiment, the camera is arranged to be automatically set in one of the following combinations of modes: In the family mode, the one shot mode is selected for the AF mode; the single-frame shooting mode for the film advance mode; a program chart (1) for the exposure program when no flash device is used; and a flash chart (4) for the program when a flash device is used. In the snap mode, the servo mode is selected for the AF mode; the continuous shooting mode for the film advance mode; the program chart (1) for the program when no flash device is used; and the flash chart (4) for the program when a flash device is used. In the scenery mode, the one shot mode is selected for the AF mode; the single-frame shooting mode for the film advance mode; a program chart (2) for the program when no flash device is used; and the flash chart (4) for the program when a flash device is used. In the sport mode, the servo mode is selected for the AF mode; the continuous shooting mode for the film advance mode; a program chart (3) for the program when no flash device is used; and the flash chart (4) for the program when a flash device is used. In the portrait mode, the one shot mode is selected for the AF mode; the continuous shooting mode for the film advance mode; the program chart (3) for the program when no flash device is used; and the flash chart (4) for the program if a flash device is used. In the close-up mode, the one shot mode is selected for the AF mode; the single-frame shooting mode for the film advance mode; the program chart (2) for the program when no flash device is used; and a flash chart (5) for the program if a flash device is used. In the party mode, the one shot mode is selected for the AF mode; the single-frame shooting mode for the film advance mode; the program chart (1) for the program when no flash device in used; and a flash chart (6) for the program if a flash device is used.

Figure 5:
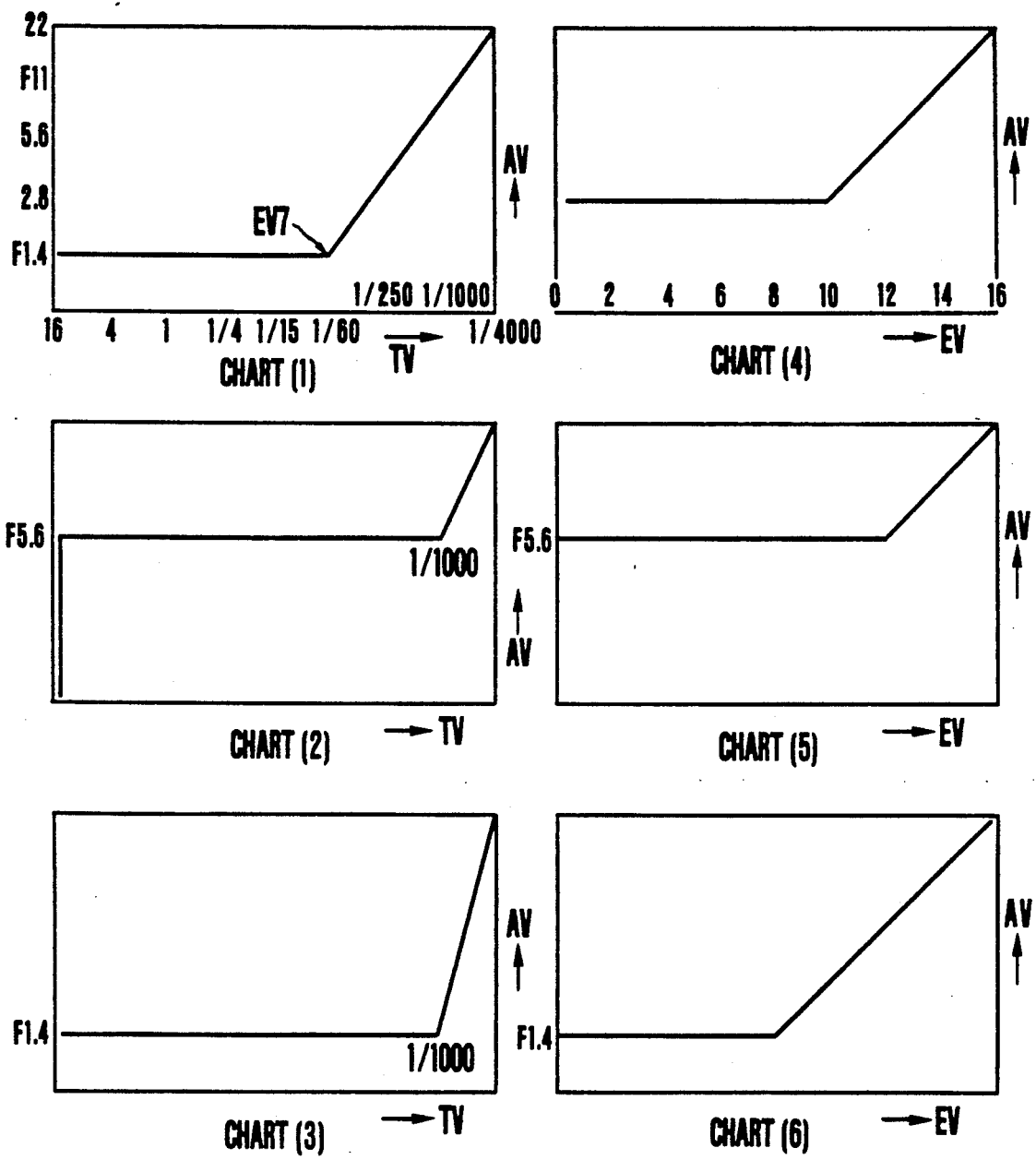
FIG. 5 shows by way of example program charts selectable by the embodiment.

These program charts (1) to (3) and the flash charts (4) to (6) are arranged as shown in FIG. 5. Further, data for the combinations of modes shown in FIG. 4 is previously set within a ROM which is included in a microcomputer MC1. Each of these modes of FIG. 4 is selected for the following reasons:

REASON FOR SELECTING THE AF MODE

In the family mode, the scenery mode, the portrait mode, the close-up mode and the party mode, the camera is not required to follow any fast moving object. Therefore, the one shot mode in which a focusing action is brought to a stop after an in-focus state is attained is selected as the AF mode. In the snap mode and the sport mode, the camera is expected to follow some objects that are moving at a certain speed. Therefore, the servo mode in which the focusing action is continuously performed following the moving object is selected as the AF mode.

Reason for Selecting the Film Advance Mode:

In the family mode, the scenery mode, the close-up mode and the party mode, the single-frame shooting mode is selected for film feeding, because pictures are generally taken frame by frame in these modes. In the family mode in particular, this selection is advantageous for a beginner photographer because: Two frames would not be continuously wasted even if the shutter release button happens to be continuously pushed by mistake. Whereas, in the case of the snap mode, the sport mode and the portrait mode, the camera is preferably set in the continuous shooting mode for the purpose of catching the movement of the object, a subtle change in the face expression of the object or the like.

Reason for selecting the Program Chart when no Flash Device is used:

In the family mode, the snap mode and the party mode, the program chart (1) which is an ordinary program and is not particularly biased toward high shutter speeds nor toward low shutter speeds. Referring to FIG. 5, in the program chart (1): The shutter speed changes between 16 sec and 1/60 sec at an aperture value of F1.4 for an exposure value range from EV-3 to EV7; and a point having the aperture value F1.4 and the shutter speed 1/60 sec is connected to a point having an aperture value F22 and a shutter speed value of 1/4000.

In the scenery mode and the close-up mode, the program chart (2) is used for obtaining a deep depth of field with the aperture stopped down. In the chart (2), the aperture varies between F1.0 to F5.6 at the shutter speed of 16 sec for an exposure value range from EV-5 to EV1. For exposure values from EV1 to EV19, the shutter speed varies between 16 sec and 1/1000 sec at the aperture value of F5.6. For exposure values from EV19 to EV23, a point having the aperture value F5.6 and the shutter speed 1/1000 sec is connected to a point where the aperture value is F22 and the shutter speed 1/4000 sec.

In the sport mode and the portrait mode, the program chart (3) is selected. In the chart (3): Within a range of exposure values from EV-34 to EV13, the aperture value is F1.4 and the shutter speed varies between 16 sec and 1/1000 sec. For exposure values from EV13 to EV23, a point having the aperture value of F1.4 and the shutter speed of 1/1000 sec is connected to a point having the aperture value of F22 and the shutter speed of 1/4000 sec. The program chart (3) is arranged to give a high shutter speed for a fast moving object and at the same time to give an aperture value for a shallow depth of field.

REASON FOR SELECTING THE FLASH CHART WHEN A FLASH DEVICE IS USED

The flash chart (4) is selected for the family mode, the snap mode, the scenery mode, the sport mode and the portrait mode. The flash chart (4) is arranged as follows: For exposure values up to EV10, light is adjusted by selecting an aperture value F2.8. For exposure values ranging from EV10 to EV16, light is adjusted with the aperture varied between F2.8 and F22. In all these cases, the shutter speed is set at 1/125 sec which is a synchronizing time. In the flash chart (4), the depth of field and the reachable distance of flash light are both taken into consideration for normal flash photography.

The flash chart (5) is selected for the close-up mode. In the flash chart (5): For exposure values up to EV12, the light is adjusted with the aperture value set at F5.6. For exposure values EV12 to EV16, the aperture value varies between F5.6 and F22 in adjusting the light. In either case, the shutter speed is set at 1/125 of a second which is a synchronizing time. The chart (5) gives a depth of field suited for close-up photography.

The flash chart (6) is selected for the party mode. In the flash chart (6): The light is adjusted by setting the aperture value at F1.4 for exposure values up to EV8. The aperture value varies between F1.4 and F22 in adjusting the light for exposure values ranging from EV8 through EV16. In either case, the shutter speed is set at the synchronizing time of 1/125 of a second. The flash chart (6) is arranged to give the flash light in sufficient quantity even for the background.

Figure 6:
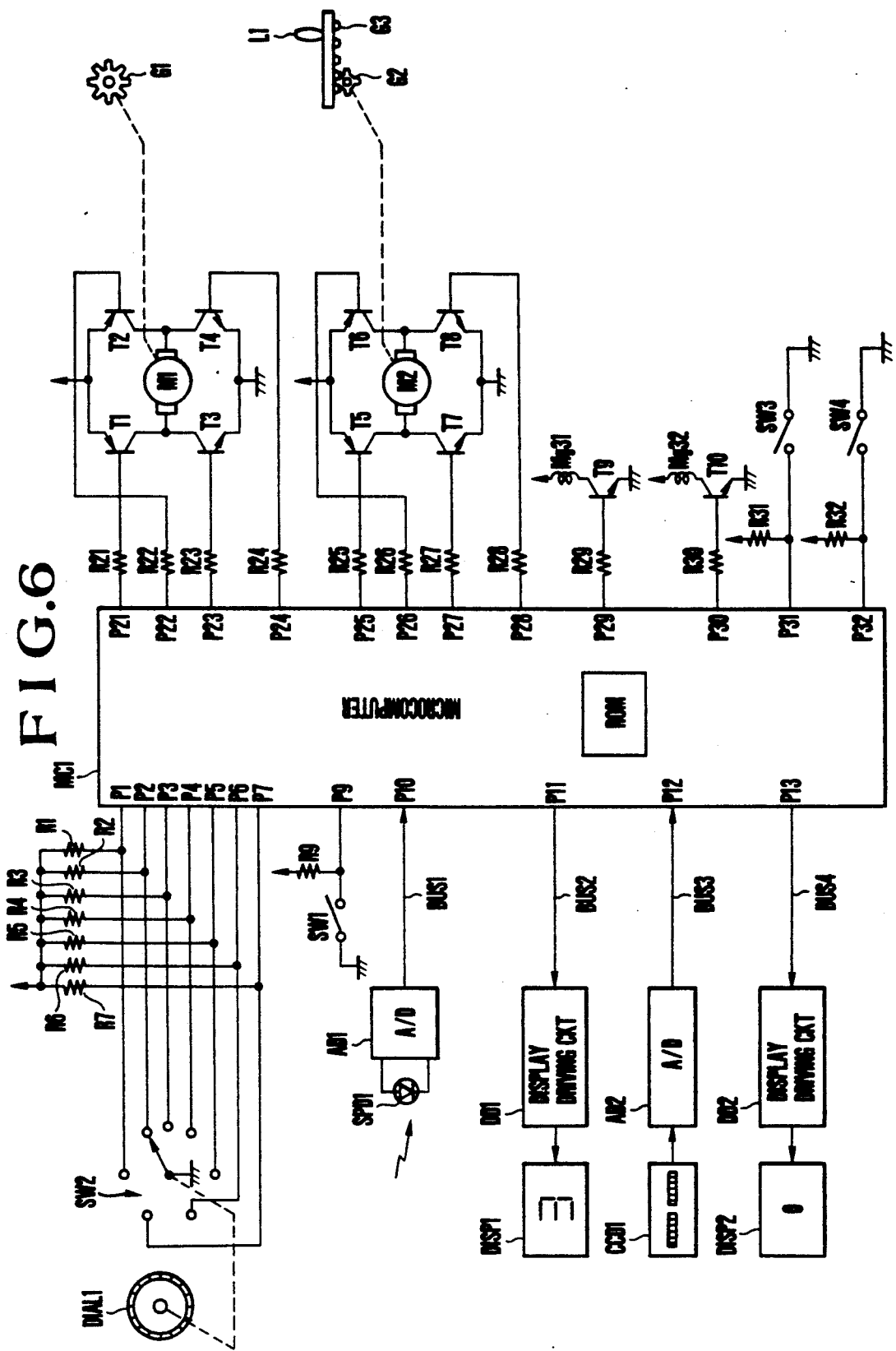
FIG. 6 is a circuit diagram showing the electrical circuit arrangement of a camera which is arranged as the embodiment of this invention to permit selection of photographing condition modes.

FIG. 6 shows by way of example the electrical circuit arrangement of a camera embodying this invention. Referring to FIG. 6, a microcomputer MC1 is arranged to control the operations of the camera. A rotary switch SW2 is arranged to rotate accordingly as the dial DIAL1 of FIG. 1 is turned round. The microcomputer MC1 is provided with input ports P1 to P7. One of these input port S is turned on when the dial DIAL1 is turned while others remain off. Reference symbols R1 to R7 denote pull-up resistors. An input port P9 is arranged to receive a low level signal when the release button SW1 of FIG. 1 is turned on. A silicon photodiode SPD1 is provided for a light measuring action. An A/D (analog-to-digital) converter AD1 is arranged to convert the signal of the silicon photodiode SPD1 which is of an analog value into a digital value and to supply the digital signal to the microcomputer MC1 through a bus line BUS1. An input port P10 is arranged to receive the A/D converted signal.

A display driving circuit DD1 is arranged to drive the display device DISP1 of FIG. 1. An output port P11 is provided for sending a signal to the display driving circuit DD1 through a bus line BUS2. A line sensor CCD1 is provided for a distance measuring action. An A/D converter AD2 is arranged to convert into a digital signal the signal of the line sensor CCD1 which is of an analog value and to supply the digital signal to the microcomputer MC1 via a bus line BUS3. An input port P12 is provided for receiving the A/D converted signal from the A/D converter AD2. A display device DISP2 is arranged to display a focusing state, for example, within the view finder of the camera. A display driving circuit DD2 is arranged to drive the display device DISP2. An output port P13 is provided for sending a signal to the display driving circuit DD2 via bus line BUS4.

A motor M1 is provided for feeding a film which is not shown. One end of the motor M1 is connected to the collector of a PNP transistor T1 and that of an NPN transistor T3. To the other end of the motor M1 are connected the collector of a PNP transistor T2 and that of an NPN transistor T4. The emitters of the PNP transistors T1 and T2 are connected to the positive side of a power supply voltage. The emitters of the NPN transistors T3 and T4 are connected to the negative side of the power supply voltage. The bases of the PNP transistors T1 and T2 are respectively connected via base resistors R21 and R22 to the output ports P21 and P22 of the microcomputer MC1. The bases of the NPN transistors T3 and T4 are connected via base resistors R23 and R24 to the output ports P23 and P24 of the microcomputer MC1. As apparent from this arrangement, a current flows from the left to the right as viewed on the drawing to cause the motor M1 to rotate rightward when the transistors T1 and T4 are in their on-states. With the motor rotating rightward, the camera performs film advancing and shutter charging actions. When the transistors T2 and T3 are in their on-states, a current flows from the right to the left to cause the motor M1 to rotate leftward for a film rewinding action. For this purpose, the motor M1 is interlocked with a sprocket G1.

Another motor M2 is arranged to shift back and forth the position of a photo-taking optical system L1. One end of the motor M2 is connected to the collector of a PNP transistor T5 and that of an NPN transistor T7. The other end of the motor M2 is connected to the collector of a PNP transistor T6 and that of a NPN transistor T8. The emitters of the PNP transistors T5 and T6 are connected to the positive side of the power supply voltage; and the emitters of the NPN transistors T7 and T8 to the negative side of the power supply voltage. The bases of the PNP transistors T5 and T6 are respectively connected via base resistors R25 and R26 to the output ports P25 and P26 of the microcomputer MC1. The bases of the NPN transistors T7 and T8 are connected respectively via base resistors R27 and R28 to the output ports P27 and P28 of the microcomputer MC1. When the transistors T5 and T8 are in their on-states, a current flows from the left to the right to cause the motor M2 to rotate rightward. The rightward rotation of the motor M2 causes the photo-taking optical system L1 to move forward via a pinion gear G2 and a rack G3. When the transistors T6 and T7 are on, a current flows from the right to the left to cause the motor M2 to rotate leftward. The leftward rotation of the motor M2 causes the optical system L1 to move backward through the pinion gear G2 and the rack G3.

An NPN transistor T9 is a switching transistor. The NPN transistor T9 has its emitter grounded and its collector connected via a magnet coil Mg31 to the positive side of the power supply voltage. The base of the transistor T9 is connected via a resistor R29 to the output port P29 of the microcomputer MC1. When this transistor T9 is turned on, the magnet coil Mg31 is energized to cause the leading curtain of a shutter (not shown) to travel. An NPN transistor T10 is also a switching transistor. The emitter of the transistor T10 is grounded. Its collector is connected to the positive side of the power supply voltage via a magnet coil Mg32. The base of the transistor T10 is connected via a resistor R30 to the output port P30 of the microcomputer MC1. When the transistor T10 is turned on, the magnet Mg32 is energized to cause the trailing curtain of the shutter to travel.

A reference symbol SW3 denotes the change-over switch which is arranged to turn on in using a flash device as mentioned in the foregoing. A pull-up resistor R31 is connected to the switch SW3. The switch SW3 is connected to the input port P31 of the microcomputer MC1. The position of this switch SW3 permits detection of whether a flash device is mounted on the camera body. A symbol SW4 denotes the setting button of FIG. 1 which is provided for input of information on the photographing condition mode selected. A pull-up resistor R32 is connected to the setting button SW4. The setting button SW4 is connected to the input port P32 of the microcomputer MC1. This enables microcomputer MC1 to find the on- or off-state of the setting button SW4.

Figure 7:
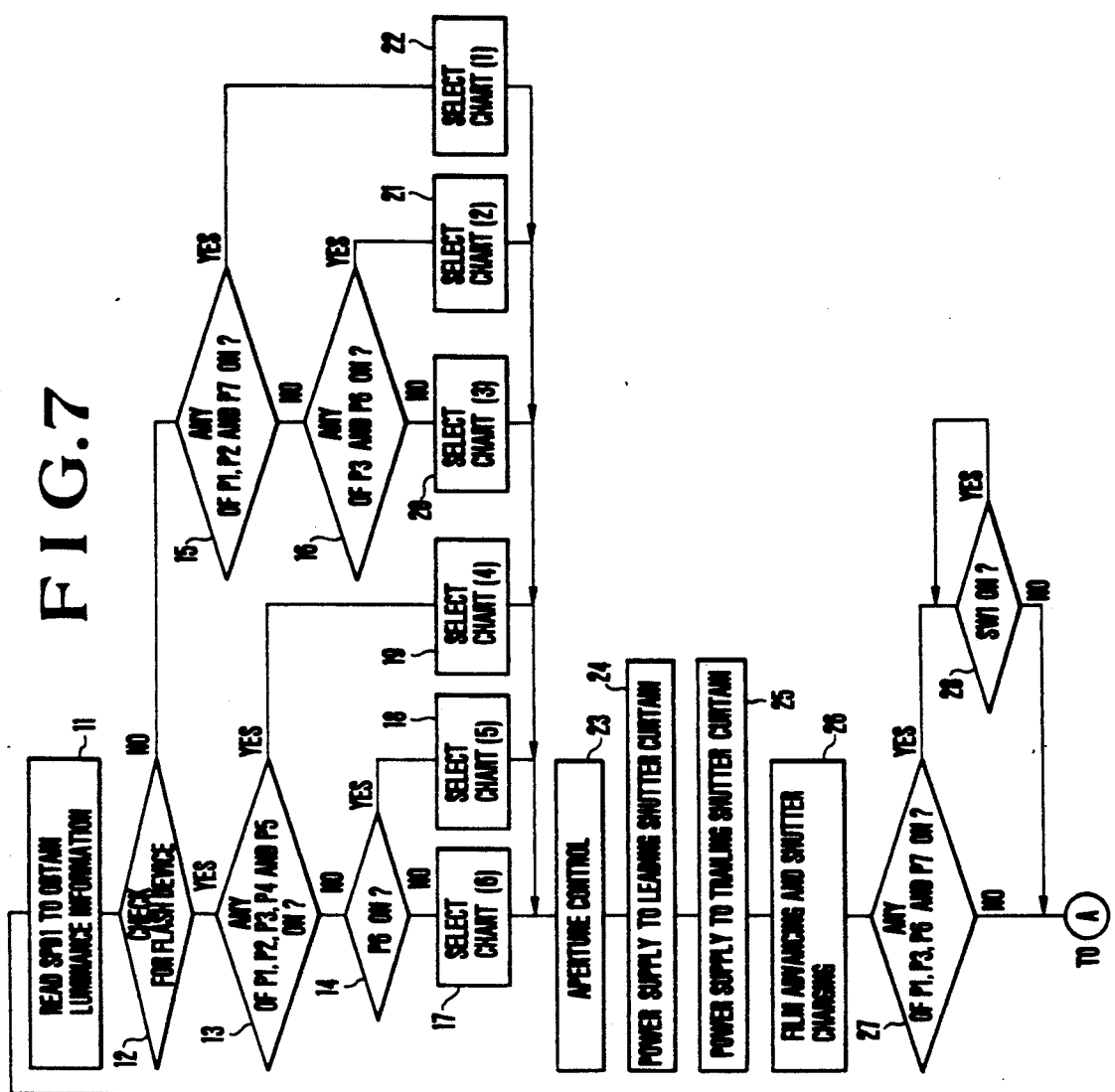
FIG. 7 is a flow chart showing the operation of the same embodiment.

With the circuit arranged as stated above, the operation of the embodiment is described below with reference to FIG. 7 which is a flow chart showing the operation of the microcomputer MC1:

Step 1: A flag JF which is arranged to store information on an in-focus state is set at "0" at the step 1. Step 2: Input to the rotary switch SW2 is read. The input ports P1 to P6 are checked to find any of them to have a low level input signal. Step 3: Data for a matter to be displayed is supplied from the output port P11 via the bus line BUS2 to the display driving circuit DD1. In this instance, if the setting switch (or button) SW4 is in an off-state, the data is produced to cause the counted value of the frame counter to be displayed.

Meanwhile, in a case where the setting switch SW4 is in an on-state and the input port P1 is found to have received a low level signal, the above-stated data is produced to cause the display device DISP1 to display "1" to indicate selection of the family mode. If the input port P2 is found to have received a low level signal, the data is produced to have "2" displayed to indicate selection of the snap mode. If the input port P3 is found to have received a low level signal, the data is produced to have "3" displayed to indicate selection of the scenery mode. It the input port P4 is found to have received a low level signal, the data is produced to have "4" displayed to indicate selection of the sport mode. If the input port P5 is found to have received a low level signal, the data is produced to have "5" displayed to indicate selection of the portrait mode. If the input port P6 is found to have received a low level signal, the data is produced to have "6" displayed to indicate selection of the close-up mode. If the input port P7 is found to have received a low level signal, the data is produced to have "7" displayed to indicate selection of the party mode.

Further, in the event of an off-state of the setting switch (or button) SW4, if a high level signal is found to have been received at the input port P1, data is produced to have a letter "P" which stands for the word "program" displayed in a flickering manner.

Step 4: In a case where a low level signal is received at any of the input ports P1, P3, P5, P6 and P7, the one-shot mode is selected for the AF mode. In that case, the flow of operation branches to a step 5. If a low level signal is received at the input port P2 or P4, the flow comes to a step 6 to select the servo mode for the AF mode. Step 5: With the one-shot mode selected for the AF mode, the AF action is not performed after an in-focus state is attained. Therefore, the flag JF which is arranged to store an in-focus state is checked. If the flag JF is found to be at "1", the flow comes to a step 10 and the AF action is no longer performed. If the flag JF is found to be at "0" thus not showing any in-focus state, the flow comes to the step 6.

Step 6: Image data output from the line sensor CCD1 is read. Step 7: A check is made for an in-focus position. If the result of the check is NO, the flow comes to the step 10. If the result of the check is YES, the flow proceeds to a step 8. Step 8: Signals are output from the output ports P25, P26, P27 and P28 to shift the phototaking optical system L1 to an in-focus position by moving it back and forth. Step 9: The data for causing the display device to make an in-focus display is supplied from the output port P13 via the bus line BUS4 to the display driving circuit DD2. Further, the flag JF which stores information on that an in-focus state has been attained is set at "1". Step 10: The input port P9 is checked to find if the shutter release button SW1 has been pushed. If a low level signal has been supplied to the input port P9, it indicates that the shutter release button SW1 has been pushed. If so, therefore, the flow comes to a step 11. If not, the flow comes back to the step 2 to repeat the above-stated steps in a looping manner.

Step 11: Luminance information output from the silicon photodiode SPD1 is read from the input port P10 through the bus line BUS1. Then, a photometric computing operation is performed to determine a shutter speed and an aperture value. Step 12: A check is made through the input port P31 for the state of the change-switch SW3 to find if a flash device is mounted on the camera body. It not, the flow branches out to a step 15. If so, the flow proceeds to a step 13.

Step 13: With the flash device mounted, if any of the input ports P1, P2, P3, P4 and P5 has a low level signal, the flow branches out to a step 19 to select the flash chart (4). Step 14: With the flash device mounted, if the input to the input port P6 is found to be a low level signal, the flow branches out to a step 18 to select the flash chart (5). If not, the flow comes to a step 17 to select the flash chart (6).

Step 15: With no flash device mounted, if any of the input ports P1, P2 and P7 is found to have a low level input signal, the flow branches out to a step 22 to select the program chart (1). Step 16: With no flash device mounted, if any of the input ports P3 and P6 is found to have a low level input signal, the flow comes to a step 21 to select the program chart (2). If not, the flow comes to a step 20 to select the program Step 17: An aperture value is obtained from the flash chart (6) according to the luminance of ambient light. The shutter speed is set at the synchronizing time value. Step 18: An aperture value is obtained from the flash chart (5) according to the luminance of the ambient light. The shutter speed is set at the synchronizing time value. Step 19: An aperture value is obtained from the flash chart (4) according to the luminance of ambient light; and the shutter speed is set at the synchronizing time value. Step 20: An aperture value and the shutter speed value are obtained from the program chart (3) according to the luminance of ambient light. Step 21: An aperture value and the shutter speed value are obtained from the program chart (2) according to the luminance of ambient light. Step 22: An aperture value and the shutter speed value are obtained from the program chart (1) according to the luminance of ambient light.

Step 23: The position of diaphragm blades which are not shown is stopped down to a point which corresponds to an aperture value obtained by the above-stated step. Step 24: A high level signal is output from the output port P30 to turn on the NPN transistor T9. This causes a current to be supplied to the magnet Mg31. As a result, the leading curtain of the shutter (not shown) is released from a clamped state and is allowed to travel. Step 25: After the lapse of a waiting period of time adjusted to the shutter speed, a high level signal is output from the output port P31. The high level signal turns on the NPN transistor T10 to energize the magnet Mg32. The magnet Mg32 then releases the trailing curtain of the shutter from its clamped state to allow it to travel.

Step 26: Signals are output from the output ports P21, P22, P23 and P24 to turn on the transistors T1 and T4. This causes the motor M1 to rotate rightward to perform a film advancing action.

Step 27: If any of the input ports P1, P3, P6 and P7 has a low level input signal, the flow comes to a step 28 to select the single-frame shooting mode for film advancing. If not, the flow comes back to the step 2 to prepare for the next shot.

Step 28: With the single-frame shooting mode selected for film advancing, the next shot cannot be taken until the shutter release button SW1 is first released from the pushing pressure of a finger of the operator. The flow remains at the step 28 until the button SW1 is freed from the pushing pressure to be turned off. Therefore, the input port P9 is checked for the state of the button SW1. If the button SW1 is turned off, the flow comes back to the step 2 to prepare for the next shot.

In accordance with the arrangement of this embodiment, the applicable kinds of the AF mode, the film advance mode and the program chart are automatically selected and set in a combination best suited for the current photographing conditions by just inputting the mode of the photographing condition. Therefore, the photographer is relieved from the toilsome task of choosing the correct kind of mode for each of the various modes to be set. This enables even a beginner photographer to take good pictures under varied photographing conditions.

The embodiment, as described in the foregoing, comprises photographing condition mode input means for inputting information on a mode that is apposite to the current photographing conditions among many selectable photographing condition modes; storing means for storing information on the above-stated various photographing condition modes together with a predetermined combination of a series of modes that are suited for each of the photographing condition modes; means for detecting the photographing condition mode inputted by the photographing condition mode input means; and control means which is arranged to select from within the storing means a series of setting modes corresponding to the photographing condition mode detected by the detecting means and to automatically set the camera in these modes. This enables the photographer to bring the camera into an optimum state having the AF mode, the film advance mode, the exposure program automatically set for current photographing conditions by just inputting information on the current photographing condition mode. The operability of the camera is thus enhanced. The embodiment enables any person unaccustomed to camera operations to take pictures in a manner apposite to current photographing conditions.

Further, in the embodiment, display instructing means is arranged to cause the display means to display information on the photographing condition mode detected by the detecting means in a form different from other photographing information. Therefore, one and the same display means can be used for displaying information of different kinds to obviate the necessity of arranging any additional display means for the purpose of displaying the information on the photographing condition mode. This feature of the embodiment prevents increases in the size and cost of the camera.

What is claimed is:

1. A camera comprising:

automatic focusing means for focusing in each of a plurality of different automatic focusing modes including at least first and second automatic focusing modes including at least first and second automatic focusing modes wherein in the first automatic focusing mode, once an in-focus state is attained, a photo-taking optical system is kept in the position of the in-focus state, and in the second automatic focusing mode, even after attainment of an in-focus state, the position of the photo-taking optical system is continuously shifted in response to a movement of a photographing object to newly bring the photo-taking optical system into an in-focus state;

advancing means for advancing a recording medium in each of a plurality of advance modes, including at least first and second advance modes, wherein in the first advance mode only one frame portion of the recording medium is advanced even when a shutter releasing operation is continuously performed, and in the second advance mode the recording medium is advanced for every photographing shot while the shutter releasing operation continues;

exposure means for executing each of a plurality of exposure programs including at least first and second programs, wherein said exposure means determines an aperture value and a shutter speed according to a change in the luminance of an object to be photographed when operating according to the first program, wherein said exposure means determines an aperture value and a shutter speed also according to a change in the luminance of said object when operating according to the second program, and wherein said exposure means determines different aperture values and different shutter speeds when operating according to the first and second programs even for the same object's luminance;

a memory circuit for storing the automatic focusing modes, the advance modes and the exposure programs in different combinations, each of the combinations consisting of a specific automatic focusing mode, a specific advancing mode and a specific exposure program;

setting means for setting a plurality of photographing modes; and a control circuit for allowing a photographing operation to be carried out in an applicable combination of the specific automatic focusing mode, the specific advance mode and the specific exposure program stored in said memory circuit, when a specific photographic mode is set by said setting means.

2. A camera according to claim 1, further comprising display means for displaying that a specific photographing mode is set by said setting means.

3. A camera according to claim 1, wherein said setting means includes two operation members disposed on a camera body, said two operation members being arranged to permit said specific photographing mode to be set only when said two members are simultaneously operated.

4. A camera according to claim 3, wherein one of said two operation members is a push button and the other is a dial.

5. A camera according to claim 1, further comprising discrimination means for making a discrimination between use and nonuse of a flash device, said control means being arranged to perform exposure control by forcedly selecting another program when the use of a flash device is detected by said discrimination means.

6. A camera according to claim 2, wherein said display means is arranged to numerically display the kind of said photographing mode by utilizing a numerical display part provided for the purpose of displaying camera information other than said photographing mode.

* * * * *

UNITED STATES PATENT AND TRADEMARK OFFICE
CERTIFICATE OF CORRECTION

PATENT NO. 5,191,372
DATED       March 2, 1993
INVENTOR(S) Yoshihiko Aihara

It is certified that error appears in the above-indentified patent and that said Letters Patent is hereby corrected as shown below:

On title page

At [56]

"4,977,217" should read --4,982,217--.

At [75]

"Kanagawa," should read --Yokohama,--.

On drawing

Sheet 2

Fig. 4, "SCNERY MODE" should read --SCENERY MODE--.

Column 1

Line 67, "FIG. 4" should read --¶ FIG. 4--.

Column 4

Line 40, "which" should be deleted.

Column 5

Line 43, "port S" should read --ports--.

UNITED STATES PATENT AND TRADEMARK OFFICE
CERTIFICATE OF CORRECTION

PATENT NO. : 5,191,372
DATED : March 2, 1993
INVENTOR(S) : Yoshihiko Aihara

It is certified that error appears in the above-indentified patent and that said Letters Patent is hereby corrected as shown below:

Column 7

Line 44, "It" should read --If--.

Column 8

Line 33, "change-switch SW3" should read --change-over switch SW3--;
    Line 51, "program" should read --program chart (3).--.

IN THE CLAIMS:

Column 10

Line 20, "modes" should read --modes,--;
    Line 20, "including at least first and second auto-" should be deleted;
    Line 21, "matic focusing modes" should be deleted.

UNITED STATES PATENT AND TRADEMARK OFFICE
CERTIFICATE OF CORRECTION

PATENT NO. : 5,191,372

DATED : March 2, 1993

INVENTOR(S) : Yoshihiko Aihara

It is certified that error appears in the above-indentified patent and that said Letters Patent is hereby corrected as shown below:

<u>Column 11</u>

Line 2, "photographic" should read --photographing--.

Signed and Sealed this

Twelfth Day of April, 1994

BRUCE LEHMAN

*Commissioner of Patents and Trademarks*

*Attest:*

*Attesting Officer*